United States Patent
Konno (10) Patent No.: US 10,193,165 B2
(45) Date of Patent: Jan. 29, 2019

(54) SEPARATOR AND FUEL CELL

(71) Applicant: TOYOTA JIDOSHA KABUSHIKI KAISHA, Toyota-shi, Aichi-ken (JP)

(72) Inventor: Norishige Konno, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 155 days.

(21) Appl. No.: 15/022,083

(22) PCT Filed: Oct. 1, 2014

(86) PCT No.: PCT/JP2014/005013
§ 371 (c)(1),
(2) Date: Mar. 15, 2016

(87) PCT Pub. No.: WO2015/049864
PCT Pub. Date: Apr. 9, 2015

(65) Prior Publication Data
US 2016/0226082 A1    Aug. 4, 2016

(30) Foreign Application Priority Data

Oct. 2, 2013    (JP) ................................ 2013-207086

(51) Int. Cl.
*H01M 8/02* (2016.01)
*H01M 8/24* (2016.01)
(Continued)

(52) U.S. Cl.
CPC ......... *H01M 8/026* (2013.01); *H01M 8/0258* (2013.01); *H01M 8/0267* (2013.01); *H01M 8/2483* (2016.02); *H01M 2008/1095* (2013.01)

(58) Field of Classification Search
None
See application file for complete search history.

(56) References Cited

U.S. PATENT DOCUMENTS

| 2002/0168562 A1 | 11/2002 | Funatsu et al. | |
| 2012/0301806 A1* | 11/2012 | Okabe | H01M 8/242 429/437 |
| 2013/0177827 A1 | 7/2013 | Okabe et al. | |

FOREIGN PATENT DOCUMENTS

| CN | 102906917 A | 1/2013 |
| JP | 2000-113897 | 4/2000 |

(Continued)

*Primary Examiner* — Jonathan Crepeau
*Assistant Examiner* — Angela J Martin
(74) *Attorney, Agent, or Firm* — Dickinson Wright, PLLC (57) ABSTRACT

A separator has a recess-projection shape formed by press working. The separator has one surface as a gas circulation surface and an opposite surface as a cooling surface, the gas circulation surface having a reactive gas flow path including a plurality of reactive gas flow path grooves resulting from the recess-projection shape, the cooling surface having a cooling water flow path including a plurality of cooling water flow path grooves resulting from the recess-projection shape. The cooling water flow path includes an intersection flow path portion including cooling water flow path grooves adjacent to each other with a reactive gas flow path groove of the reactive gas flow path therebetween, and a communication flow path groove formed at the cooling surface side of the reactive gas flow path groove between the adjacent cooling water flow path grooves, the communication flow path groove being shallower than the cooling water flow path grooves; and a cooling water turn portion where a direction of the cooling water flow path grooves changes. A reactive gas turn portion is formed at the gas circulation surface in a position on the rear side of the cooling water turn portion, and the reactive gas turn portion is formed of a groove portion having a constant depth.

4 Claims, 6 Drawing Sheets

(51) Int. Cl.
*H01M 8/026* (2016.01)
*H01M 8/2483* (2016.01)
*H01M 8/0258* (2016.01)
*H01M 8/0267* (2016.01)
*H01M 8/1018* (2016.01)

(56) References Cited

FOREIGN PATENT DOCUMENTS

WO  WO 2012/035585 A1  3/2012
WO  WO 2012/160607 A1  11/2012

* cited by examiner

SEPARATOR AND FUEL CELL

CROSS-REFERENCE TO RELATED APPLICATIONS

This application is a national phase application of International Application No. PCT/JP2014/005013, filed Oct. 1, 2014, and claims the priority of Japanese Application No. 2013-207086, filed Oct. 2, 2013, the content of both of which is incorporated herein by reference.

TECHNICAL FIELD

This invention relates to a separator used in a fuel cell, and a fuel cell.

BACKGROUND ART

Some conventional separators used in a fuel cell have an uneven shape formed by press working to make a groove-like reactive gas flow path on one surface and a groove-like cooling water flow path on an opposite surface. For example, patent literature 1 teaches a separator having a groove-like flow path extending in a serpentine pattern formed as a fuel gas (hydrogen) flow path on one surface and a groove-like linear flow path formed as a cooling water flow path on an opposite surface. In this separator, the fuel gas flow path has a region where the directions of the flow path change to make each of the fuel gas flow path and the cooling water flow path extend in an orthogonal direction. A shallow groove portion shallower than the other groove portion is formed at a fuel gas flow path groove in this region. As viewed from the cooling water flow path, a groove allowing cooling water to pass through is formed on the rear side of this shallow groove portion. Thus, linear cooling water flow paths parallel to each other are interconnected through this groove to form orthogonal cooling water flow paths. A portion where the direction of the fuel gas flow path or that of the cooling water flow path changes is called a "turn portion." The other groove portion deeper than the shallow groove portion is called a "deep groove portion."

PRIOR ART LITERATURE

Patent Literature

Patent Literature 1: WO2012/160607A

SUMMARY OF INVENTION

Problem to be Solved by Invention

In the aforementioned separator, the percentage of elongation of a material differs between the deep groove portion and the shallow groove portion in the press working. Further, it is not easy to machine a die used for forming the shallow groove portion and the deep groove portion in adjacent positions at an orthogonal corner of the turn portion. These make it difficult to ensure the accuracy of a thickness after the press working. As a result, a problem such as a break or deformation may occur easily.

Solution to Problem

This invention has been made to solve at least some of the aforementioned problems. This invention can be implemented in the following aspects.

(1) According to an aspect of the invention, there is provided a separator used in a fuel cell. The separator has a recess-projection shape formed by press working. The separator has one surface as a gas circulation surface and an opposite surface as a cooling surface, the gas circulation surface having a reactive gas flow path including a plurality of reactive gas flow path grooves resulting from the recess-projection shape, the cooling surface having a cooling water flow path including a plurality of cooling water flow path grooves resulting from the recess projection shape. The cooling water flow path includes: an intersection flow path portion including cooling water flow path grooves adjacent to each other with a reactive gas flow path groove of the reactive gas flow path therebetween, and a communication flow path groove formed at the cooling surface side of the reactive gas flow path groove between the adjacent cooling water flow path grooves, the communication flow path groove being shallower than the cooling water flow path grooves; and a cooling water turn portion where a direction of the cooling water flow path grooves changes. A reactive gas turn portion is formed at the gas circulation surface in a position on the rear side of the cooling water turn portion, and the reactive gas turn portion is formed of a groove portion having a constant depth.

According to the separator of this aspect, since the reactive gas turn portion is formed of the groove portion having a constant depth, the percentage of elongation of a material is maintained constantly at the turn portion of the reactive gas flow path grooves in the press working, making it possible to alleviate a problem such as a break or deformation.

(2) In the above aspect, the groove portion of the reactive gas turn portion having the constant depth may be a shallow groove portion having the same depth as a depth at the gas circulation surface in a position corresponding to a position where the communication flow path groove is formed, or may be a deep groove portion having the same depth as a depth at the gas circulation surface in a position corresponding to a position where the communication flow path groove is not formed This can facilitate formation of the reactive gas turn portion while maintaining the percentage of elongation of a material constantly at the turn portion of the reactive gas flow path grooves in the press working, making it possible to alleviate a problem such as a break or deformation.

(3) In the above aspect, each of the reactive gas turn portion and the cooling water turn portion may have a contour with a non-angular smooth curve.

This makes it easy to shape the reactive gas turn portion of the reactive gas flow path grooves and the cooling water turn portion of the cooling water flow path grooves, making it possible to alleviate a problem such as a break or deformation.

This invention can be implemented in various aspects in addition to the separator of the aforementioned aspect. For example, this invention can be implemented in aspects such as a unit cell of a fuel cell including the separator of the aforementioned aspect, a fuel cell including this unit cell, and a fuel cell system including this fuel cell.

DESCRIPTION OF EMBODIMENTS

A. Embodiment

Figure 1:
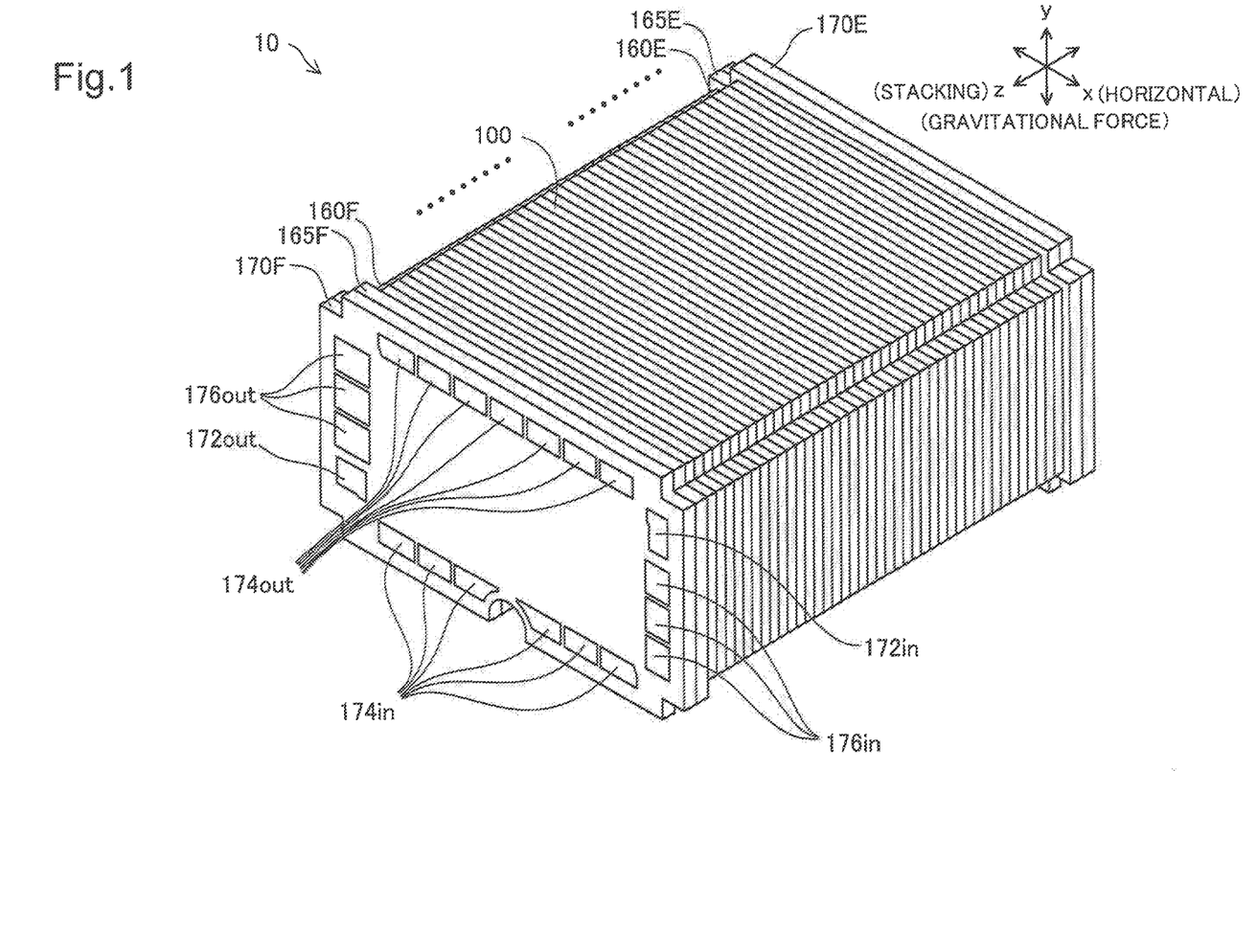
FIG. 1 is a schematic perspective view showing the structure of a fuel cell according to a first embodiment.

FIG. 1 is a schematic perspective view showing the structure of a fuel cell 10. The fuel cell 10 has a stack structure including a plurality of unit cells 100 stacked in a Z direction corresponding to a horizontal direction (hereinafter also called a "stacking direction"), and a pair of end plates 170F and 170E holding the unit cells 100 therebetween. Between the end plate 170F on a front end side and the unit cells 100, there is provided a terminal plate 160F on the front end side with intervention of an insulating plate 165F on the front end side. Likewise, between the end plate 170E on a rear end side and the unit cells 100, there is provided a terminal plate 160E on the rear end side with intervention of an insulating plate 165E on the rear end side. The unit cells 100, the terminal plates 160E and 160E, the insulating plates 165F and 165E, and the end plates 170F and 170E each have a plate-like structure of a substantially rectangular outer shape and are disposed in a manner such that their long sides extend in an X direction (horizontal direction) and their short sides extend in a Y direction (direction of gravitational force or vertical direction).

Each of the end plate 170F, the insulating plate 165F, and the terminal plate 160F on the front end side is provided with a fuel gas supply hole 172*in*, a fuel gas discharge hole 172*out*, a plurality of oxidizing gas supply holes 174*in*, a plurality of oxidizing gas discharge holes 174*out*, a plurality of cooling water supply holes 176*in*, and a plurality of cooling water discharge holes 176*out*. These supply holes and discharge holes are coupled to equivalent holes (not shown in the drawings) provided in corresponding positions of each unit cell 100 to form a supply manifold and a discharge manifold for corresponding gas or cooling water. Meanwhile, each of the end plate 170E, the insulating plate 165E, and the terminal plate 160E on the rear end side is not provided with these supply holes and discharge holes. This is for the reason that the fuel cell 10 is of a type of supplying reactive gases (fuel gas and oxidizing gas) and cooling water from the end plate 170F on the front end side to each unit cell 100 through the supply manifold while discharging exhaust gas and drainage water from each unit cell 100 to the outside from the end plate 170 on the front end side through the discharge manifold. However, this is not the only type of the fuel cell 10. The fuel cell 10 can also be configured as a fuel cell of various types such as a type of supplying reactive gas and cooling water from the end plate 170F on the front end side and discharging exhaust gas and drainage water to the outside from the end plate 170E on the rear end side, for example.

The plurality of oxidizing gas supply holes 174*in* are provided and arranged in the X direction (long-side direction) in an outer edge portion at the lower end of the end plate 170F on the front end side. The plurality of oxidizing gas discharge holes 174*out* are provided and arranged in the X direction in an outer edge portion at the upper end of the end plate 170F. The fuel gas supply hole 172*in* is provided in an upper end part in the Y direction (short-side direction) of an outer edge portion at the right end of the end plate 170F on the front end side. The fuel gas discharge hole 172*out* is provided in a lower end part in the Y direction of an outer edge portion at the left end of the end plate 170F. The plurality of cooling water supply holes 176*in* are provided and arranged in the Y direction below the fuel gas supply hole 172*in*. The plurality of cooling water discharge holes 176*out* are provided and arranged in the Y direction above the fuel gas discharge hole 172*out*.

The terminal plate 160F on the front end side and the terminal plate 160E on the rear end side are current collecting plates that collect power generated in each unit cell 100 and are used to output the collected power to the outside through a terminal not shown in the drawings.

Figure 2:
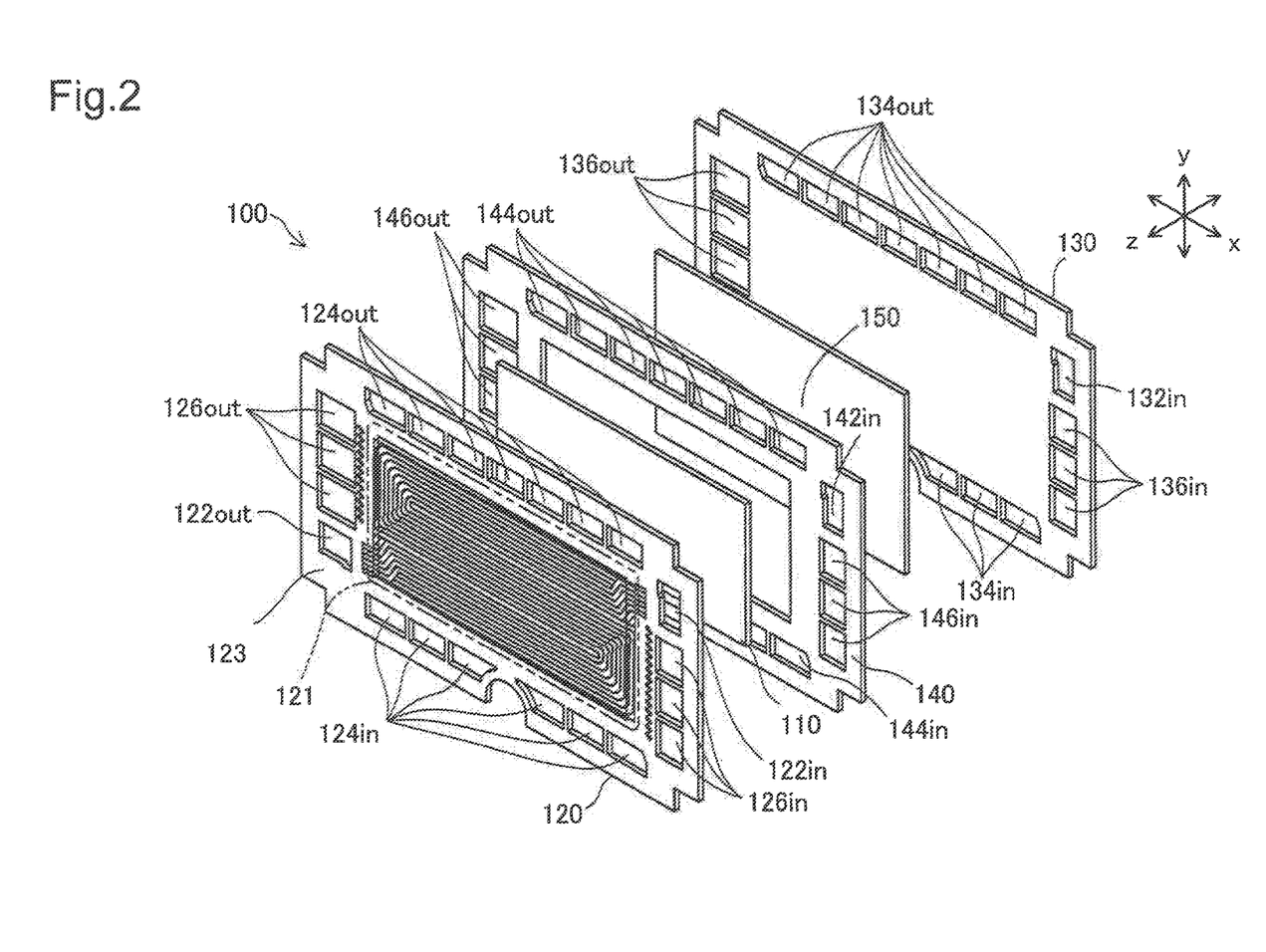
FIG. 2 is a schematic perspective view showing the structure of a unit cell in an exploded manner.

FIG. 2 is a schematic perspective view showing the structure of the unit cell 100 in an exploded manner. The unit cell 100 includes a membrane electrode and gas diffusion layer assembly (MEGA) 110, an anode-side separator 120 and a cathode-side separator 130 on opposite sides of the MEGA 110 and holding the MEGA 110 therebetween, a gas flow path member 150 interposed between the cathode-side separator 130 and the MEGA 110, and a sealing member 140 covering the outer periphery of the MEGA 110.

The MEGA 110 is a power generator including a membrane electrode assembly (MEA) with a pair of catalyst electrode layers formed on opposite sides of an electrolyte membrane and a pair of gas diffusion layers formed on opposite sides of the membrane electrode assembly. The MEGA is also called MEA in some cases.

The anode-side separator 120 and the cathode-side separator 130 are each formed of a member having gas barrier property and electron conductivity. For example, the anode-side separator 120 and the cathode-side separator 130 are each formed of a carbon member such as compact carbon impermeable to gas prepared by compressing carbon particles or a metal member such as stainless steel or titanium.

As described later, the anode-side separator 120 is provided with a groove-like fuel gas flow path formed on a surface facing the MEGA 110 and a groove-like cooling water flow path formed can an opposite surface.

The anode-side separator 120 is provided with the following holes corresponding to the aforementioned supply holes and discharge holes forming the manifolds: a fuel gas supply hole 122*in*, a fuel gas discharge hole 122*out*, a plurality of oxidizing gas supply holes 124*in*, a plurality of oxidizing gas discharge holes 124*out*, a plurality of cooling water supply holes 126*in*, and a plurality of cooling water discharge holes 126*out*. Likewise, the cathode-side separator 130 is provided with a fuel gas supply hole 132*in*, a fuel gas discharge hole 132*out*, a plurality of oxidizing gas supply holes 134*in*, a plurality of oxidizing gas discharge holes (not shown in the drawings), a plurality of cooling water supply holes 136*in*, and a plurality of cooling water discharge holes 136*out*. Likewise, the sealing member 140 is provided with the following holes corresponding to the supply holes and the discharge holes in the anode-side separator 120: a fuel gas supply hole 142*in*, a fuel gas discharge hole 142*out*, a plurality of oxidizing gas supply holes 144*in*, a plurality of oxidizing gas discharge holes (not shown in the drawings), a plurality of cooling water supply holes 146in, and a plurality of cooling water discharge holes 146out.

The gas flow path member 150 forms a gas flow path which allows oxidizing gas supplied through the oxidizing gas supply holes 134in in the cathode-separator 130 to flow in the in-plane direction of the MEGA 110 (XY-plane direction) and discharged through the oxidizing gas discharge holes 134out. For example, the gas flow path member 150 is formed of a porous material having gas diffusion properties and conductivity such as a metal porous body (expanded metal, for example).

Figure 3:
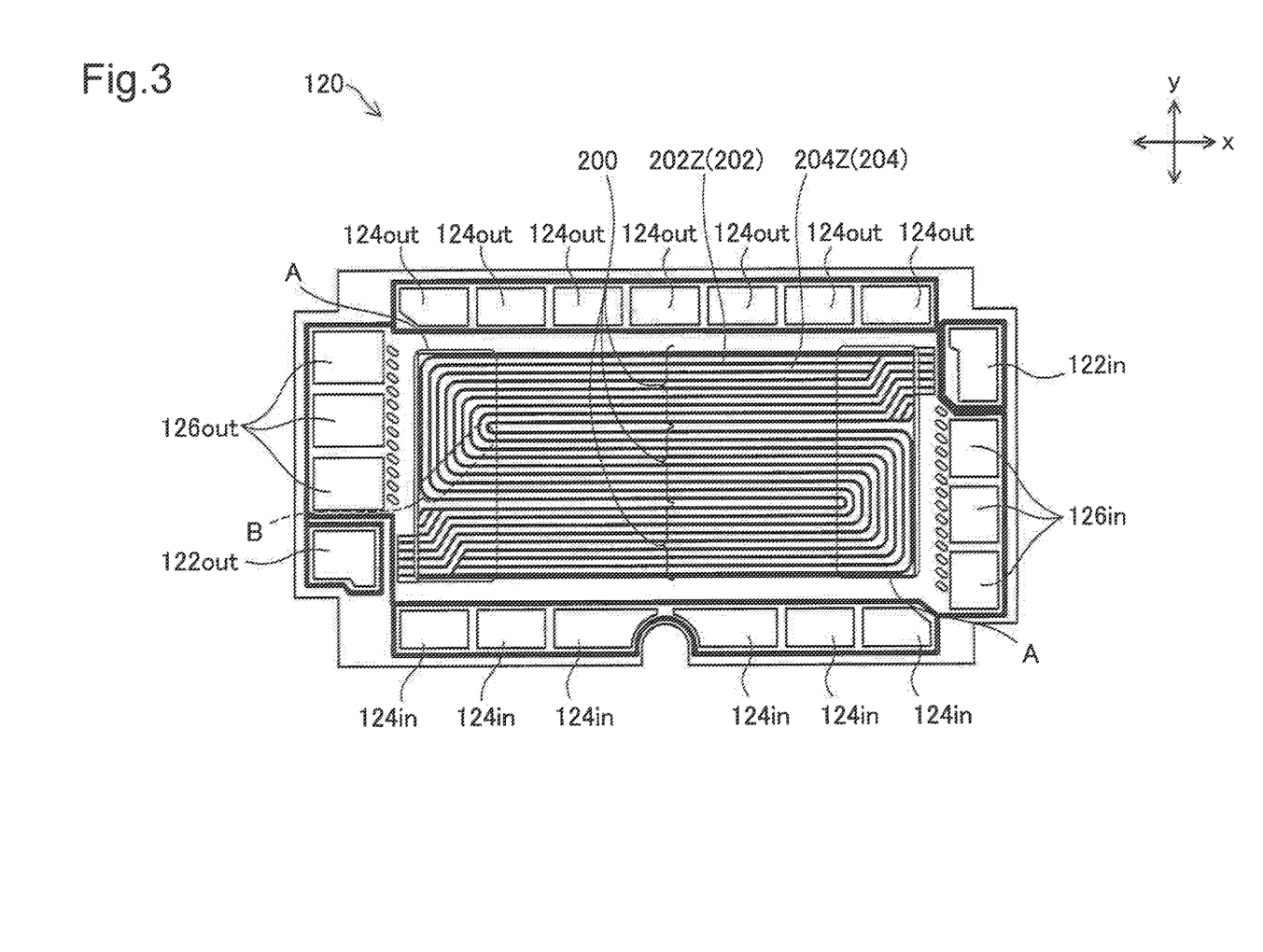
FIG. 3 is a schematic plan view showing the structure of an anode-side separator.

FIG. 3 is a schematic plan view showing the structure of the anode-side separator 120. FIG. 3 shows a state as viewed from a direction of a surface of the anode-side separator 120 facing an adjacent different unit cell 100 adjacent to this anode-side separator 120 and through which a coolant flows (hereinafter also called a "cooling surface"). A surface opposite the cooling surface and facing the MEGA 110 is also called a "gas circulation surface." As described above, the outer peripheral portion of the anode-side separator 120 is provided with the following holes as the supply holes and the discharge holes for reactive gas and cooling water: the fuel gas supply hole 122in, the fuel gas discharge hole 122out, the plurality of oxidizing gas supply holes 124in, the plurality of oxidizing gas discharge holes 124out, the plurality of cooling water supply holes 126in, and the plurality of cooling water discharge holes 126out. As shown in FIG. 2, a flow path forming region 121 (FIG. 1), formed at an inner side of these supply holes and discharge holes, has a recess-projection cross-sectional shape (undulated cross-sectional shape) including projections 202Z and depressions 204Z (also called "grooves 204Z") formed alternately on the cooling surface side. This recess-projection cross-sectional shape is formed by press working on a flat plate, for example. The rear side of the projections 202Z at the cooling surface forms fuel gas flow path grooves 202 on the gas circulation surface. The rear side of the grooves 204Z at the cooling surface forms ribs 204 for partitioning the fuel gas flow path grooves 202 on the gas circulation surface. The grooves 204Z at the cooling surface function as cooling water flow path grooves (hereinafter also called "cooling water flow path grooves 204Z"). A fuel gas flow path 200 made up of a plurality of fuel gas flow path grooves 202 is formed on the gas circulation surface to be arranged in a serpentine pattern from the fuel gas supply hole 122in toward the fuel gas discharge hole 122out. In the following description, a reference sing including a numeral and subsequent "Z" indicates a member or a part at the cooling surface, and a reference sign including the same numeral but not including subsequent "Z" indicates its rear part on the rear side of the cooling surface.

On the cooling surface side shown in FIG. 3, the projections 202Z function as ribs for partitioning the cooling water flow path grooves 204Z. Thus, if a region A in the left, end area of FIG. 3 also has the projections 202Z each of which is formed as a constant-height rib, the projections 202Z may become walls to cause the problem of disturbing the flow of cooling water from the cooling water supply holes 126in toward the cooling water discharge holes 126out. This problem is prevented by forming the projections 202Z in this region into the following structure.

Figure 4:
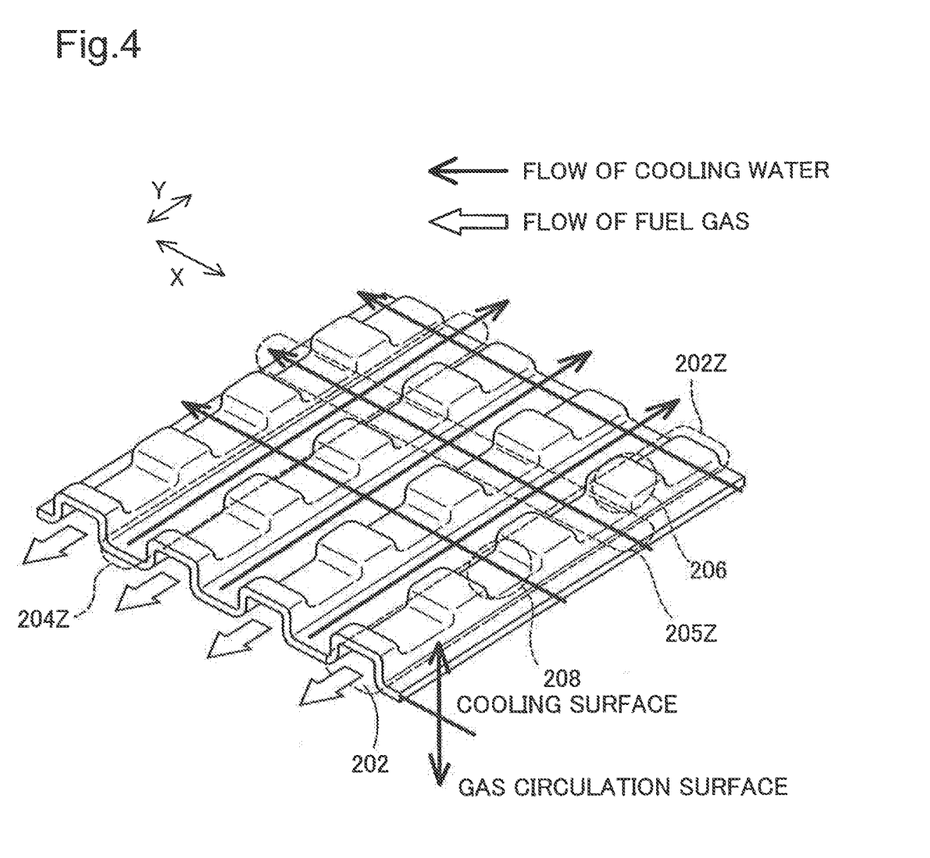
FIG. 4 is a schematic perspective view showing a part of a fuel gas flow path groove in an enlarged manner.

FIG. 4 is an enlarged schematic perspective view showing some of the fuel gas flow path grooves 202 extending in the Y direction as a part of the fuel gas flow path 200 in the region A shown in FIG. 3. In FIG. 4, the upside is the cooling surface side and the downside is the gas circulation surface side. At the gas circulation surface, the fuel gas flow path grooves 202 formed to extend in the Y direction are each provided with shallow groove portions 208. The shallow groove portions 208 are shallower than the other portions (hereinafter also called "deep groove portions 206"). The depth of the fuel gas flow path groove 202 mentioned herein means a distance from the position of a part of the gas circulation surface of the anode-side separator 120 contacting the MEGA 110 to the bottom of the fuel gas flow path groove 202. Thus, the depth of the fuel gas flow path groove 202 is large in the position of the deep groove portion 206 and small in the position of the shallow groove portion 208. The fuel gas flow path groove 202 includes the shallow groove portions 208 and the deep groove portions 206 arranged in the Y direction. Both the shallow groove portions 208 and the deep groove portions 206 do not contact the MEGA 110, thereby forming a fuel gas flow path that allows fuel gas to flow along the groove 202.

In the fuel cell 10 (see FIGS. 1 and 2) including the plurality of stacked unit cells 100, the cooling surface of the anode-side separator 120 contacts a surface of the cathode-side separator of an adjacent unit cell 100 at the rear side of the deep groove portions 206 but does not contact at the rear side of the shallow groove portions 208. As a result, communication flow path grooves 205Z are formed between the rear side of the shallow groove portions 208 of the anode-side separator 120 and the surface of the cathode-side separator 130 such that the communication flow path grooves 205Z interconnect every two adjacent cooling water flow path grooves 204Z adjacent to the rear side of each shallow groove portion 208. This structure allows cooling water to flow not only in the Y direction (direction of gravitational force) along the cooling water flow path grooves 204Z but also in the X direction (horizontal direction) through the communication flow path groove 205Z. In this way, the projections 202Z extending in the Y direction can be prevented from blocking flow of cooling water in the X direction.

Though not shown in the drawings, the fuel gas flow path grooves 202 extending in the X direction in the region A shown in FIG. 3 are preferably also provided with the shallow groove portions 208. This can prevent the projections 202Z extending in the X direction from blocking flow of cooling water in the direction.

Though not shown in the drawings, not only are the fuel gas flow path grooves 202 extending in the X and directions but also the fuel gas flow path grooves 202 extending in directions oblique to the X and Y directions are preferably also provided with the shallow groove portions 208. This can prevent the projections 202Z from blocking flow of cooling water in the X or Y direction.

As described above, the cooling water flow path has an intersection flow path portion formed of the cooling water flow path grooves 204Z extending in the X and Y directions and the communication flow path groove 205Z intersecting these cooling water flow path grooves 204Z. The cooling water flow path grooves 204Z are flow path grooves adjacent to each other with the projection 202Z on the rear side of the reactive gas flow path groove therebetween. The communication flow path groove 205Z is a flow path groove formed at the projection 202Z on the rear side of the reactive gas flow path groove. As a result, cooling water supplied from the cooling water supply holes 126in can be caused to flow toward the cooling water discharge holes 126out without being blocked by the projection 202Z extending in each of the X and Y directions.

Figure 5:
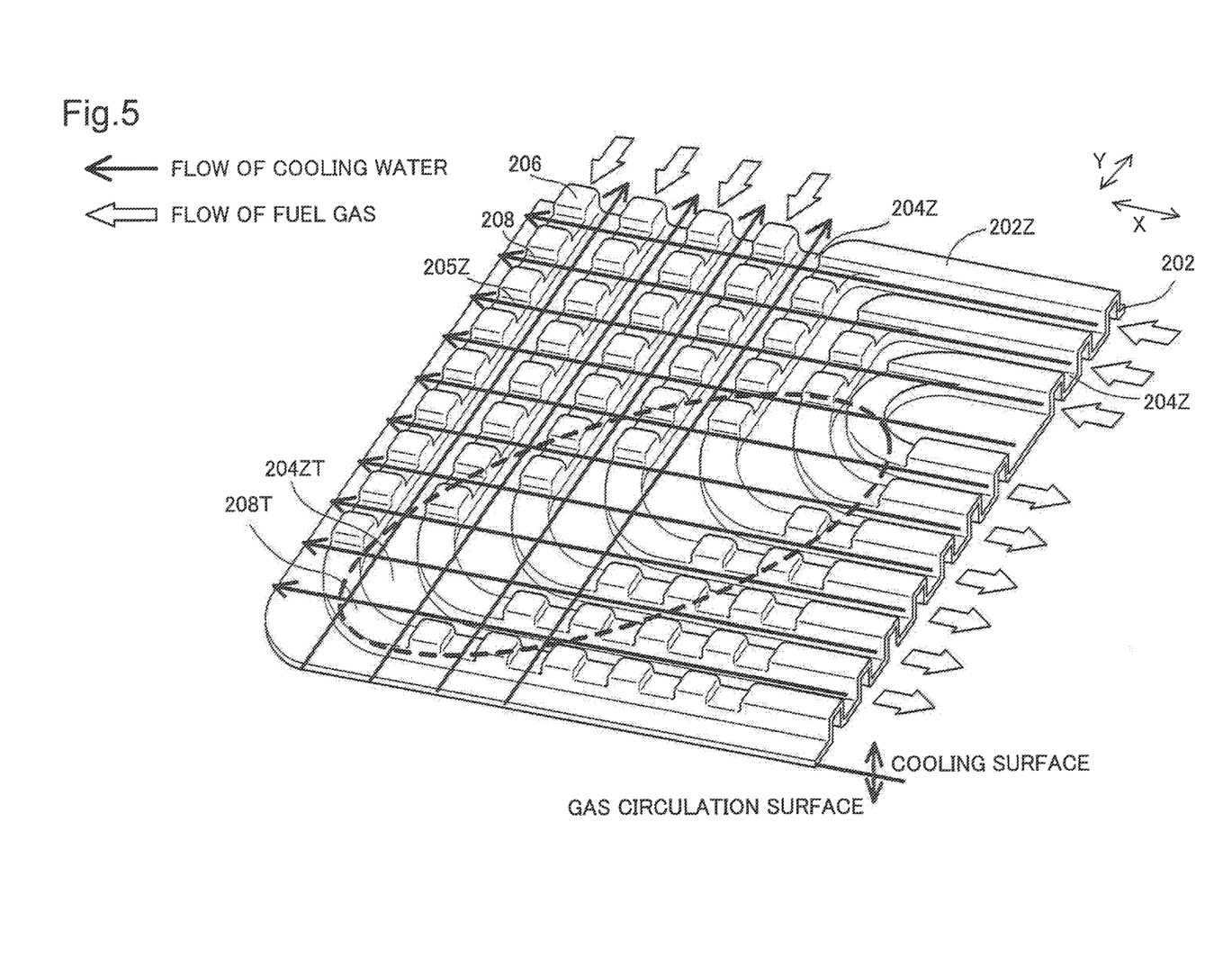
FIG. 5 is a schematic perspective view showing a turn portion in an enlarged manner as viewed from a cooling surface side where each of the direction of the fuel gas flow path groove and that of a cooling water flow path groove changes.

FIG. 5 is a schematic perspective view showing a turn portion (a region B shown in FIG. 3, for example) in an enlarged manner as viewed from the cooling surface side where each of the direction of the fuel gas flow path groove 202 and that of the cooling water flow path groove 204 changes. At the cooling surface, the flow path direction of the cooling water flow path groove 204Z changes in a region 204ZT (hereinafter called a "cooling water turn portion 204ZT") indicated by a dashed line frame of FIG. 5. Specifically, the direction of the cooling water flow path groove 204Z changes according to the shape of the cooling water turn portion 2047. At the gas circulation surface, the direction of the fuel gas flow path groove 202 changes in a region 208T (hereinafter called a "fuel gas turn portion 208T") corresponding to the rear side of the cooling water turn portion 204ZT. Specifically, the direction of the fuel gas flow path groove 202 changes according to the shape of the fuel gas turn portion 208T. In this embodiment, the fuel gas turn portion 208T is formed as a shallow groove portion having a contour with a non-angular smooth curve and a constant depth. This structure of the fuel gas turn portion 208T achieves the following effect.

Figure 6:
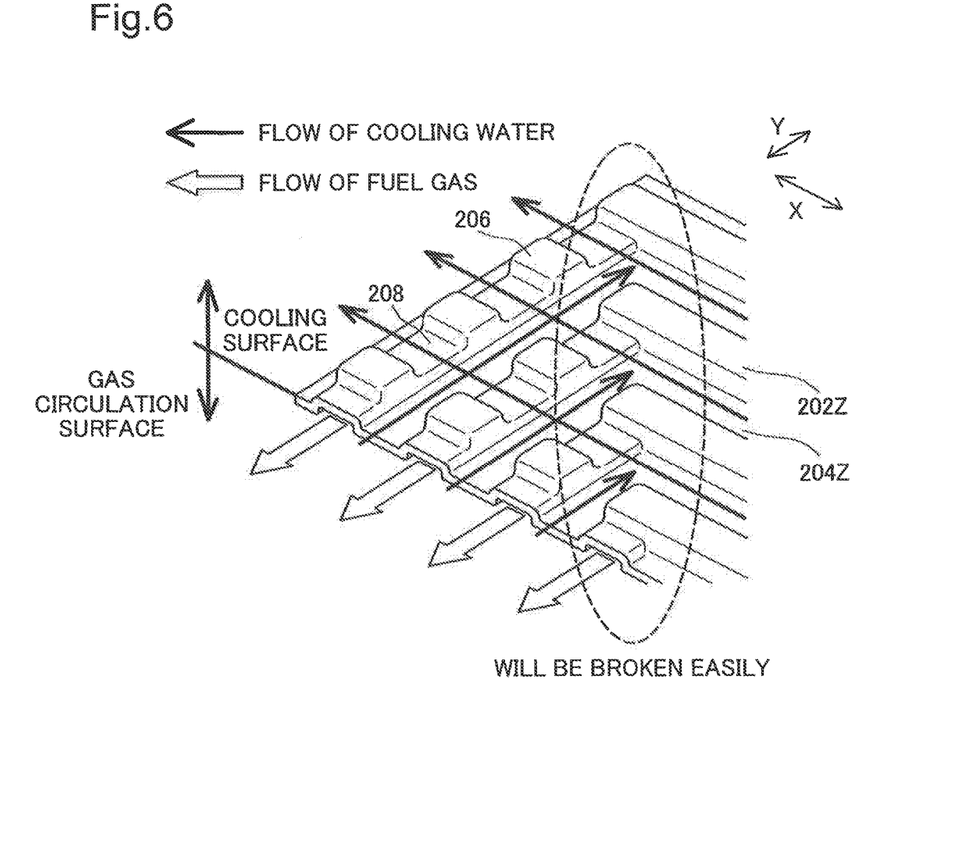
FIG. 6 is a schematic perspective view showing a turn portion of Comparative Example in an enlarged manner as viewed from the cooling surface side where each of the direction of the fuel gas flow path groove and that of the cooling water flow path groove changes.

FIG. 6 is a schematic perspective view showing a turn portion of Comparative Example in an enlarged manner as viewed from the cooling surface side where each of the direction of the fuel gas flow path groove and that of the cooling water flow path groove changes. According to Comparative Example, a fuel gas turn portion at the fuel gas flow path groove 202 indicated by a dashed line has a shape with the deep groove portion 206 and the shallow groove portion 208 adjacent to each other at a corner of the fuel gas turn portion. As referred to in the description of the problem to be solved, an inclined surface of a die to be used for press working should be formed appropriately so as to conform to the shape of a turn portion where the direction of a flow path changes. Forming a highly-accurate shape is difficult particularly for a corner (orthogonal part). Additionally, if a separator is made by press working on a thin plate, the percentage of elongation of a material differs largely between a deep groove portion and a shallow groove portion in the press molding. In this case, after the press molding, the thickness of the separator is very likely to differ largely between the deep groove portion 206 and the shallow groove portion 208. For these reasons, the thickness may differ largely between the deep groove portion 206 and the shallow groove portion 208 adjacent to each other particularly at the corner. This makes it impossible to achieve a minimum required thickness for shape retaining, so that a problem such as a break or deformation may occur easily in the separator. Thus, the Comparative Example finds difficulty in shaping the deep groove portion 206 and the shallow groove portion 208 with a high degree of accuracy at the fuel gas turn portion (particularly at its corner) of the fuel gas flow path groove 202.

In contrast, according to the aforementioned embodiment, the fuel gas flow path groove 202 in the fuel gas turn portion 208T (FIG. 5) is a shallow groove portion having a contour with a non-angular smooth curve and a constant depth, as described above. This makes it possible to maintain the percentage of elongation of a material constantly at the turn portion in the press working. As a result, a problem such as a break or deformation referred to in Comparative Example can be alleviated. If the fuel gas turn portion 208T is a shallow groove portion having a constant depth, efficiency of distributing cooling water is enhanced compared to the structure of the Comparative Example. Meanwhile, compared to the structure of the Comparative Example, the area of contact with the cathode-side separator 130 adjacent to the anode-side separator 120 is reduced at the fuel gas turn portion 208T. Reduction in the contact area causes increase in contact resistance, leading to reduction in maximum output of a fuel cell. Thus, in order to minimize increase in the contact resistance to minimize reduction in the maximum output of the fuel cell, it is preferable that the region of the reaction gas turn portion 208T be determined in such a manner as to satisfy requirements relating to the maximum output and the contact resistance of the fuel cell.

The turn portion in the region B of FIG. 3 is given as an example in the foregoing description. A comparable structure is applicable to a turn portion in a different region where each of the direction of the fuel gas flow path groove and that of the cooling water flow path groove changes.

B. Modifications

In the aforementioned embodiment, the fuel gas flow path groove 202 in the fuel gas turn portion 206T (FIG. 5) is a shallow groove portion having a contour with a non-angular smooth curve and a constant depth. Alternatively, the fuel gas flow path groove 202 in the fuel gas turn portion 208T may be a deep groove portion having a contour with a non-angular smooth curve and a constant depth. Even in this case, the percentage of elongation of a material can still be maintained constantly at the turn portion in the press working. Thus, a problem such as a break or deformation referred to in the Comparative Example can also be alleviated. If the fuel gas turn portion 208T is formed as a deep groove portion, the area of contact with the cathode-side separator 130 adjacent to the anode-side separator 120 is increased at the fuel gas turn portion 208T while efficiency of distributing cooling water is reduced compared to the structure of the Comparative Example. Whether forming the fuel gas turn portion 208T as a shallow groove portion or as a deep groove portion can be selected in a manner that depends on the margin of an entire system to cool a fuel cell.

In the aforementioned embodiment and modifications, the fuel gas flow path groove 202 in the fuel gas turn portion 208T is a groove portion having a contour with a non-angular smooth curve and a constant depth. Alternatively, the fuel gas flow path groove 202 in the fuel gas turn portion 208T may be a groove portion having a contour with an angle and a constant depth. Meanwhile, a contour with a non-angular smooth curve can be formed more easily by press working, can alleviate a problem such as a break or deformation, and can be formed with a higher degree of accuracy.

The aforementioned description of the embodiment includes the fuel gas flow path of the anode-side separator 120. A flow path structure comparable to the structure of the fuel gas flow path is applicable to an oxidizing gas flow path of a cathode-side separator.

This invention is not limited to the aforementioned embodiment, Examples, or modifications but can be implemented in various structures within a range that does not deviate from the substance of this invention. As an example, technical features in the embodiment, those in Examples, or those in the modifications corresponding to those in each of the aspects described in Summary of Invention can be replaced or combined, where appropriate, with the intention of solving some or all of the aforementioned problems or achieving some or all of the aforementioned effects. Components of the aforementioned embodiment and each of the modifications, except those described in independent claims, are additional elements and can be omitted, where appropriate.

REFERENCE SIGNS LIST

10 . . . Fuel cell
100 . . . Unit cell
120 . . . Anode-side separator
121 . . . Flow path forming region
122in . . . Fuel gas supply hole
122out . . . Fuel gas discharge hole
124in . . . Oxidizing gas supply hole
124out . . . Oxidizing gas discharge hole
126in . . . Cooling water supply hole
126out . . . Cooling water discharge hole
130 . . . Cathode-side separator
132in . . . Fuel gas supply hole
132out . . . Fuel gas discharge hole
134in . . . Oxidizing gas supply hole
134out . . . Oxidizing gas discharge hole
136in . . . Cooling water supply hole
136out . . . Cooling water discharge hole
140 . . . Sealing member
142in . . . Fuel gas supply hole
142out . . . Fuel gas discharge hole
144in . . . Oxidizing gas supply hole
144out . . . Oxidizing gas discharge hole
146in . . . Cooling water supply hole
146out . . . Cooling water discharge hole
150 . . . Gas flow path member
160E . . . Terminal plate
160F . . . Terminal plate
165E . . . Insulating plate
165F . . . Insulating plate
170E . . . End plate
170F . . . End plate
172in . . . Fuel gas supply hole
172out . . . Fuel gas discharge hole
174in . . . Oxidizing gas supply hole
174out . . . Oxidizing gas discharge hole
176in . . . Cooling water supply hole
176out . . . Cooling water discharge hole
200 . . . Fuel gas flow path
202 . . . Fuel gas flow path groove
202Z . . . Projection
204Z . . . Cooling water flow path groove
204ZT . . . Cooling water turn portion
205Z . . . Communication flow path groove
206 . . . Deep groove portion
208 . . . Shallow groove portion
208T . . . Fuel gas turn portion

What is claimed is:

1. A separator used in a fuel cell, wherein
the separator has a recess-projection shape formed by press working,
the separator has one surface as a gas circulation surface and an opposite surface as a cooling surface, the gas circulation surface having a reactive gas flow path including a plurality of reactive gas flow path grooves resulting from the recess-projection shape, the cooling surface having a cooling water flow path including a plurality of cooling water flow path grooves resulting from the recess-projection shape,
the cooling water flow path includes:
an intersection flow path portion including cooling water flow path grooves adjacent to each other with a reactive gas flow path groove of the reactive gas flow path therebetween, and a communication flow path groove formed at the cooling surface side of the reactive gas flow path groove between the adjacent cooling water flow path grooves, the communication flow path groove being shallower than the cooling water flow path grooves; and
a cooling water turn portion where a direction of the cooling water flow path grooves changes,
wherein a reactive gas turn portion is formed at the gas circulation surface such that the reactive gas turn portion turns along the cooling water turn portion,
the reactive gas turn portion is formed of a groove portion having a constant depth, and
the groove portion of the reactive gas turn portion having the constant depth is a shallow groove portion having the same depth as a depth at the gas circulation surface in a position at a backside of a specific part of the cooling surface where the communication flow path groove is formed.

2. The separator in accordance with claim 1, wherein each of the reactive gas turn portion and the cooling water turn portion has a contour with a non-angular smooth curve.

3. A fuel cell comprising a membrane electrode assembly, a separator disposed to face the membrane electrode assembly, and a gas flow path disposed between the membrane electrode assembly and the separator for supplying reactive gas along a surface of the membrane electrode assembly, wherein
the separator has a recess-projection shape formed by press working,
the separator has one surface as a gas circulation surface and an opposite surface as a cooling surface, the gas circulation surface having a reactive gas flow path including a plurality of reactive gas flow path grooves resulting from the recess-projection shape, the cooling surface having a cooling water flow path including a plurality of cooling water flow path grooves resulting from the recess-projection shape,
the cooling water flow path includes:
an intersection flow path portion including cooling water flow path grooves adjacent to each other with a reactive gas flow path groove of the reactive gas flow path therebetween, and a communication flow path groove formed at the cooling surface side of the reactive gas flow path groove between the adjacent cooling water flow path grooves, the communication flow path groove being shallower than the cooling water flow path grooves; and
a cooling water turn portion where a direction of the cooling water flow path grooves changes,
wherein a reactive gas turn portion is formed at the gas circulation surface such that the reactive gas turn portion turns along the cooling water turn portion, and
the reactive gas turn portion is formed of a groove portion having a constant depth, and
the groove portion of the reactive gas turn portion having the constant depth is a shallow groove portion having the same depth as a depth at the gas circulation surface in a position at a backside of a specific part of the cooling surface where the communication flow path groove is formed.

4. The fuel cell in accordance with claim 3, wherein each of the reactive gas turn portion and the cooling water turn portion has a contour with a non-angular smooth curve.

* * * * *